United States Patent
Peng et al.

(10) Patent No.: US 8,320,114 B2
(45) Date of Patent: Nov. 27, 2012

(54) MOUNTING APPARATUS FOR DATA STORAGE DEVICE

(75) Inventors: Wen-Tang Peng, Tu-Cheng (TW); Lian Li, Shenzhen (CN); Xin-Hu Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 199 days.

(21) Appl. No.: 13/013,820

(22) Filed: Jan. 26, 2011

(65) Prior Publication Data

US 2012/0153111 A1  Jun. 21, 2012

(51) Int. Cl.
*H05K 7/16* (2006.01)
(52) U.S. Cl. .............................. 361/679.31; 248/316.7
(58) Field of Classification Search ............. 361/679.31, 361/679.33, 679.34, 679.35, 679.36; 248/316.7
See application file for complete search history.

(56) References Cited

U.S. PATENT DOCUMENTS

| 7,130,187 | B1 * | 10/2006 | Sun ........................... 361/679.34 |
| 7,441,744 | B2 * | 10/2008 | Chen et al. .................... 248/694 |
| 2008/0057781 | A1 * | 3/2008 | Chen et al. .................... 439/577 |

* cited by examiner

*Primary Examiner* — Stephen M Johnson
(74) *Attorney, Agent, or Firm* — Altis Law Group, Inc.

(57) ABSTRACT

A mounting apparatus for a data storage device includes a bracket, a position member slidably accommodated in the bracket, a support member pivotably mounted to the position member, and a locking member. The locking member includes a fixing pole, a first pivoting portion extending from a first end of the fixing pole, and a second pivoting portion extending from a second end of the fixing pole. A hook extends from the second pivoting portion. The first and second pivoting portions are pivotably mounted to opposite ends of the support member. The support member is operable to be drawn out of the bracket together with the position member, and then, is operable to rotate to be perpendicular to the bracket. When the data storage device is mounted to the support member, the fixing pole resists against the date storage device, and the hook is latched with the support member.

14 Claims, 8 Drawing Sheets

MOUNTING APPARATUS FOR DATA STORAGE DEVICE

BACKGROUND

1. Technical Field

The disclosure relates to a mounting apparatus for data storage devices.

2. Description of Related Art

A bracket is often mounted in a computer enclosure, on which a storage device can be seated. However, if a data storage device is used outside the computer enclosure, another bracket outside the enclosure is needed, which can be inconvenient and costly.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
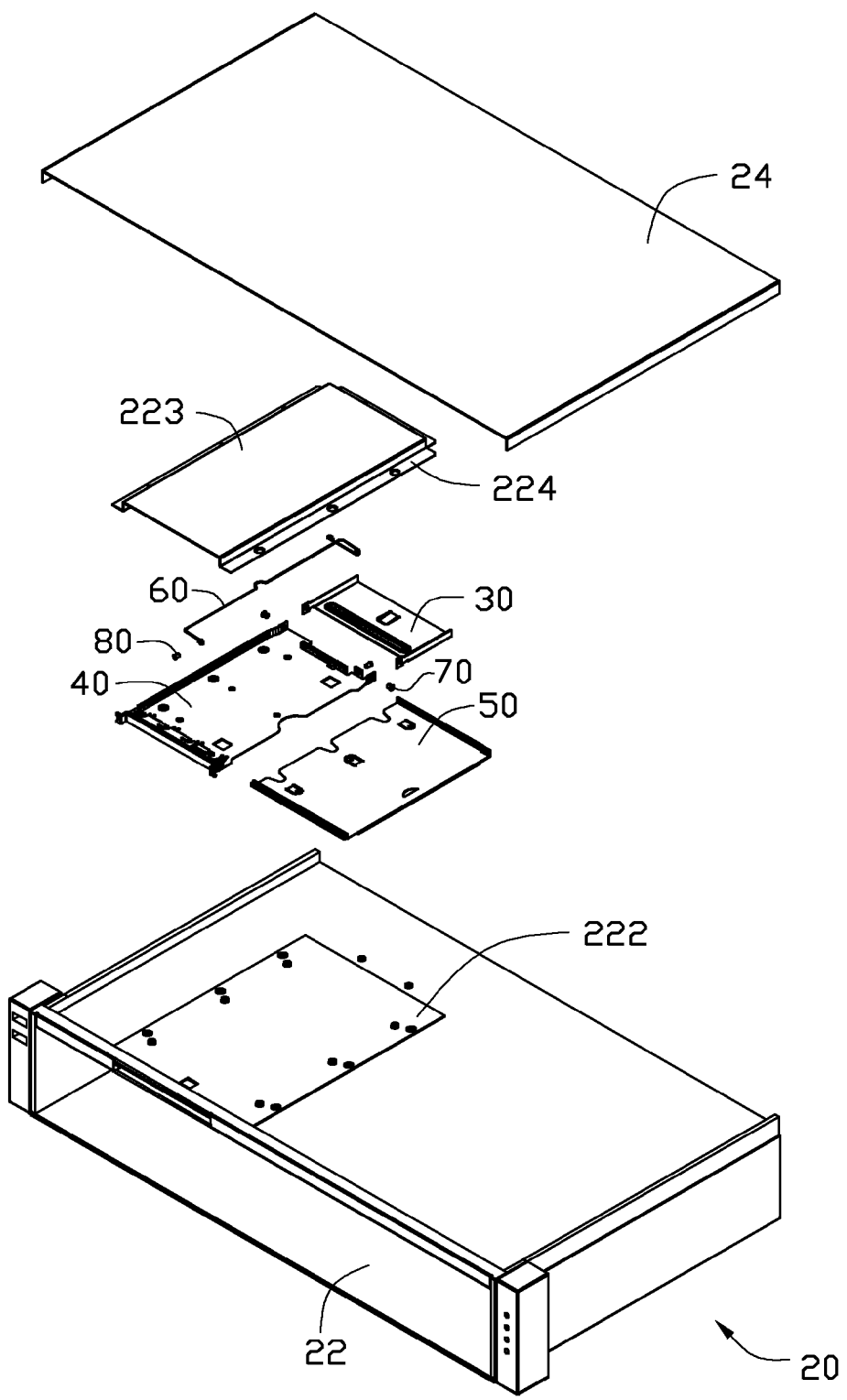
FIG. 1 is an exploded, isometric view of an exemplary embodiment of a mounting apparatus for a data storage device.
Figure 2:
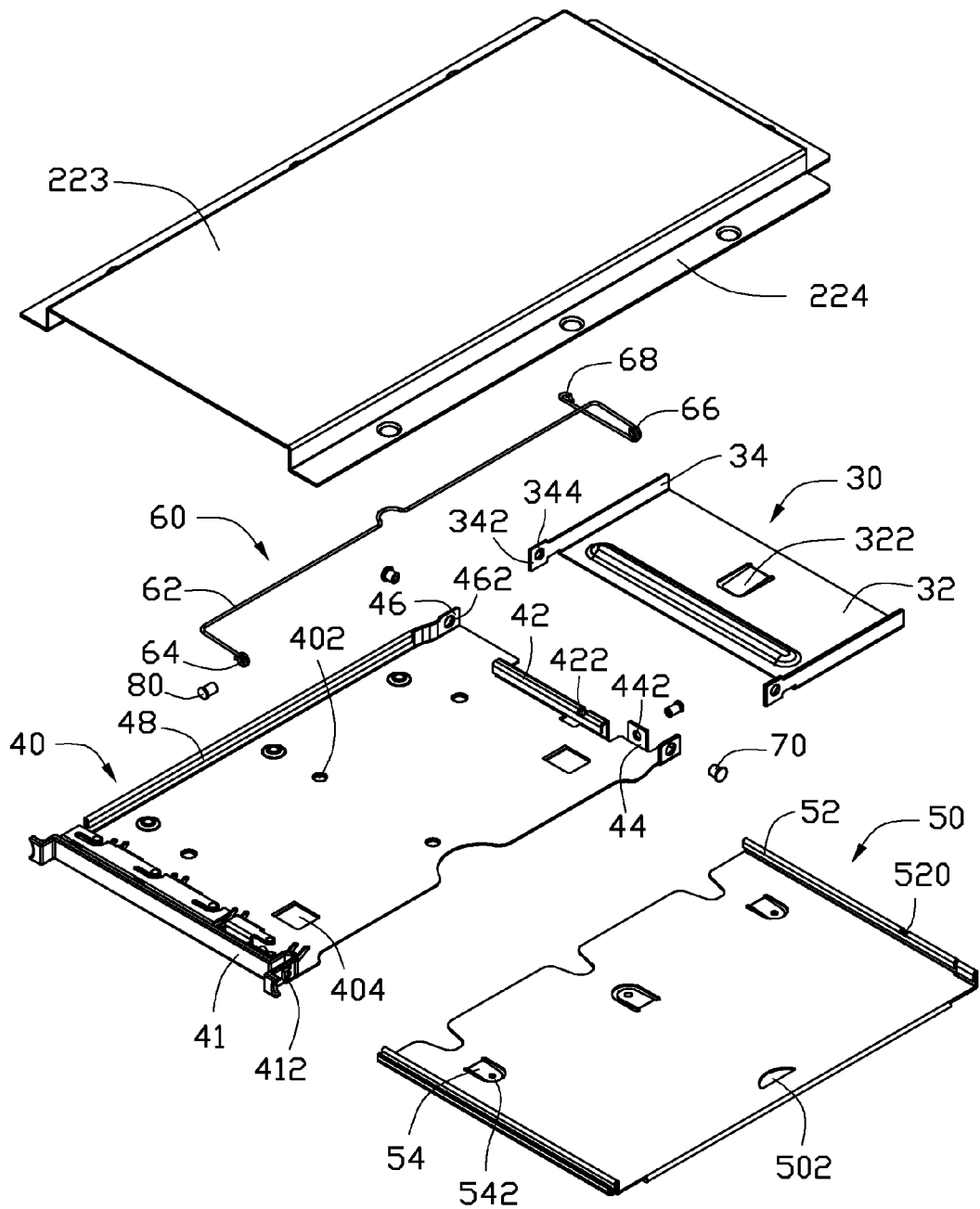
FIG. 2 is a partial, enlarged view of FIG. 1.
Figure 8:
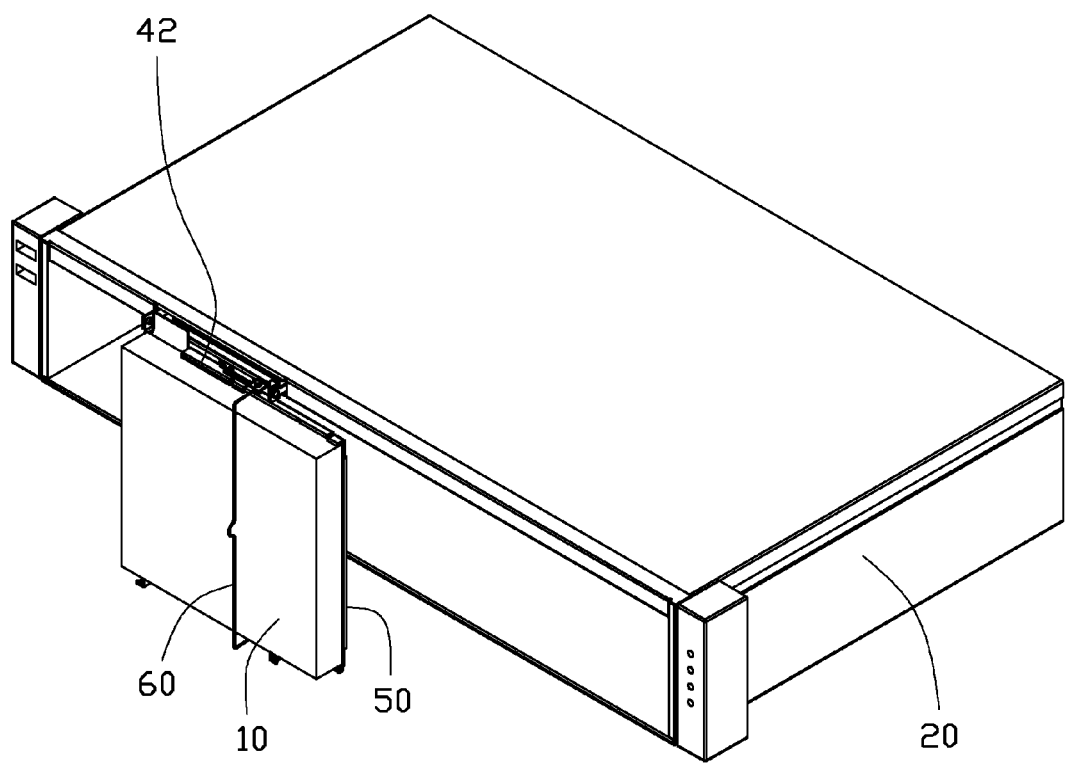
FIG. 8 is similar to FIG. 7, but shows a data storage device mounted thereto.

Referring to FIGS. 1 and 2, a mounting apparatus is provided to seat a data storage device 10 (shown in FIG. 8). The mounting apparatus includes a bracket 20, a positioning member 30 slidably mounted to the bracket 20, a support member 40 pivotably mounted to the positioning member 30, a sliding member 50 slidably mounted to the support member 40, a locking member 60, and a plurality of pins 70 and 80.

The bracket 20 includes a substantially U-shaped main body 22 and a cover 24 mounted to the main body 22. The main body 22 includes a mounting board 222 and a receiving case 223. Three tabs 224 extend outwards from opposite sidewalls and a rear end of the receiving case 223. The receiving case 223 is mounted to the mounting board 222 through the tabs 224.

The positioning member 30 includes a board 32 and two side plates 34 extending up from opposite ends of the board 32. A resilient resisting tab 322 angles down from the board 32. A mounting tab 342 extends from a front end of each side plate 34, and defines a through hole 344.

An operation portion 41 protrudes from a front end of the support member 40, and two elastic hooks 412 extend from opposite ends of the operation portion 41. A fixing block 416 (shown in FIG. 4) extends up from the support member 40, adjacent to the operation portion 41. The fixing block 416 defines a through hole (not shown). A substantially U-shaped clamping portion 42 extends up from a rear end of the support member 40, with a distal end of the clamping portion 42 facing the front end of the support member 40. The clamping portion 42 defines a clamping slot 422. A mounting hook 424 (shown in FIG. 5) extends rearward from the clamping portion 42. A fixing tab 44 protrudes up from the rear end of the support member 40, adjacent to the clamping portion 42. The fixing tab 44 defines a fixing hole 442. Two connecting boards 46 extend rearward from opposite sides of the support member 40, at the rear end of the support member 40, and each connecting board 46 defines a through hole 462. A flange 48 extends up from one side of the support member 40, connected between the connecting board 46 and one end of the operation portion 41. The support member 40 defines a plurality of positioning holes 402 adjacent to the flange 48, and defines two through holes 404 away from the flange 48.

Two rims 52 extend up from opposite ends of the sliding member 50. One of the rims 52 defines a cutout 520. A plurality of resilient resisting tabs 54 angle down from the sliding member 50, and a protrusion 542 protrudes down from a bottom of each resisting tab 54. The sliding member 50 defines an operation hole 502, away from the resisting tabs 54.

The locking member 60 includes a fixing pole 62, a first pivoting portion 64 extending from a first end of the fixing pole 62, and a second pivoting portion 66 extending from a second end of the fixing pole 62. A hook 68 extends towards the fixing pole 62 from the second pivoting portion 66.

Figure 3:
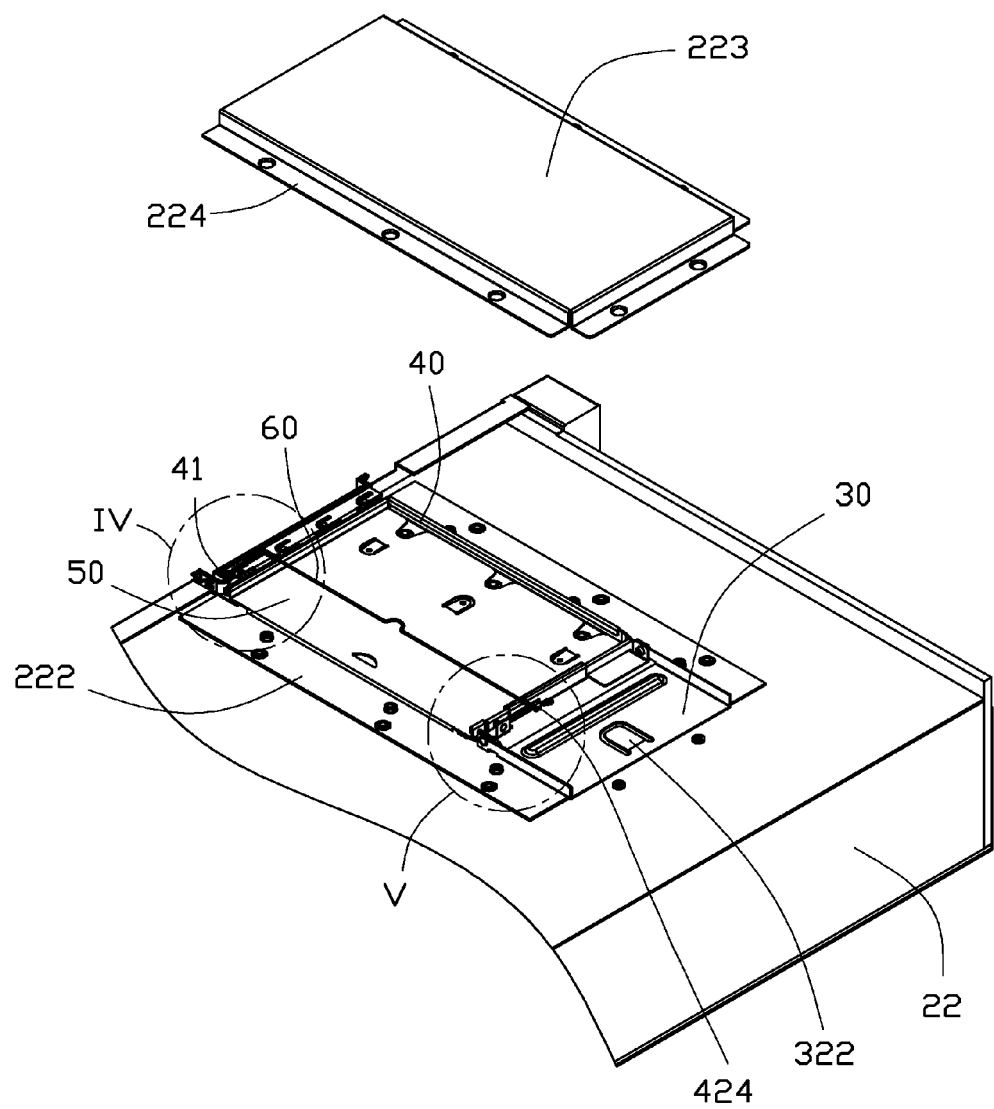
FIG. 3 is an assembled, isometric view of FIG. 1.
Figure 4:
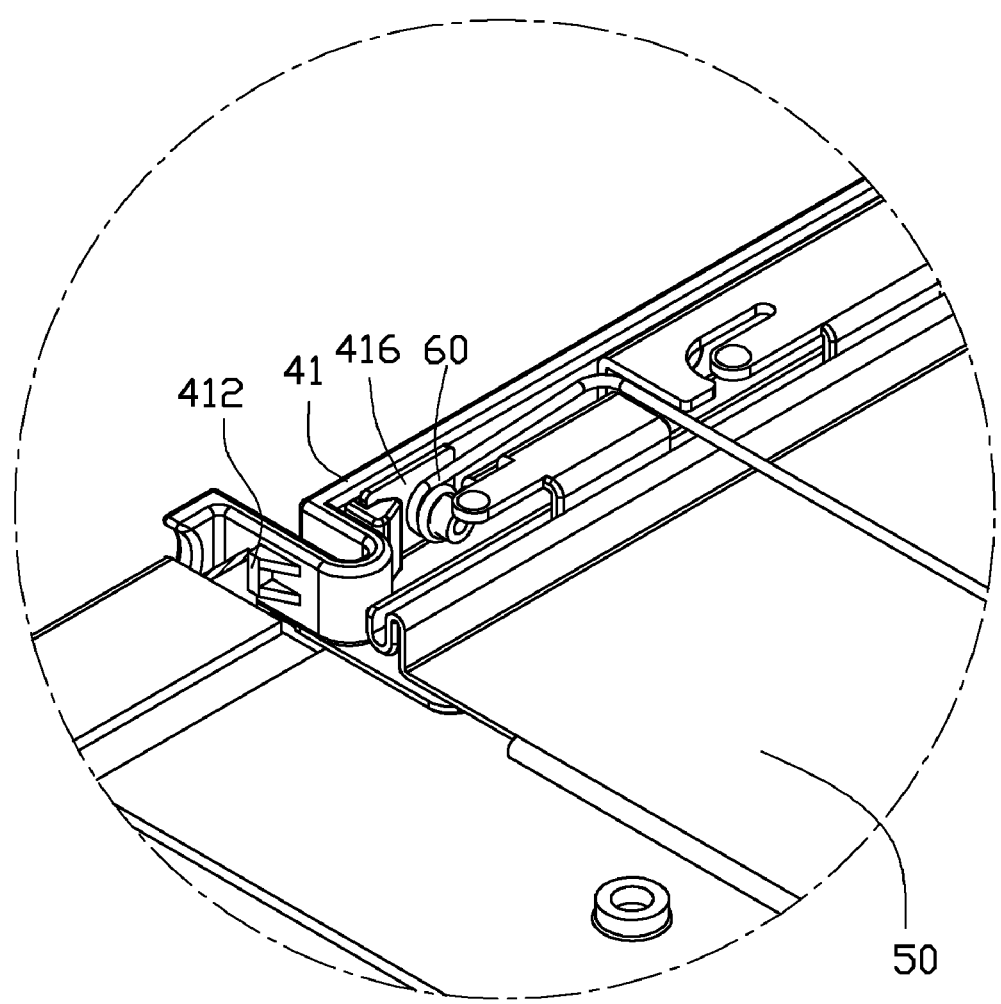
FIG. 4 is an enlarged view of the circled portion IV of FIG. 3.
Figure 5:
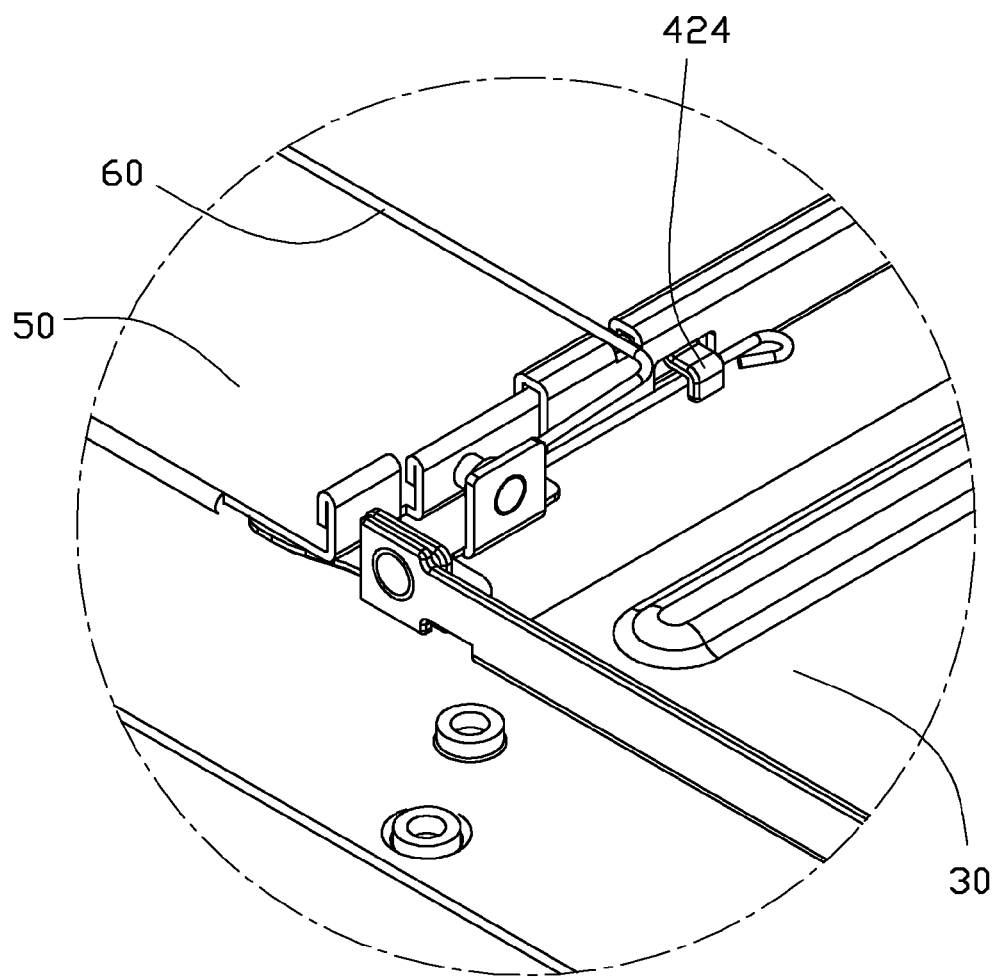
FIG. 5 is an enlarged view of the circled portion V of FIG. 3.

Referring to FIGS. 3 to 5, in assembly, the sliding member 50 is mounted to the support member 40, in a predetermined first position relative to the support member 40, with the cutout 520 of the sliding member 50 aligning with the clamping slot 422 of the support member 40. One of the rims 52 of the sliding member 50 is slidably received in the clamping portion 42. The protrusions 542 of the sliding member 50 are received in the positioning holes 402 of the support member 40, and the sliding member 50 is mounted to the support member 40. Two pins 70 are pivotably extended through the through holes 462 of the support member 40 and the through holes 344 of the positioning member 30, and the support member 40 is pivotably mounted to the positioning member 30, together with the sliding member 50. One pin 80 is extended through the first pivoting portion 64 of the locking member 60, and received in the through hole of the fixing block 416 of the support member 40. A third pin 70 is extended through the second pivoting portion 66 of the locking member 60, and is received in the fixing hole 442 of the support member 40. Therefore, the locking member 60 is mounted to the support member 40, with a corresponding end of the fixing pole 62 of the locking member 60 received in the cutout 520 and the clamping slot 422. The hook 68 of the locking member 60 is engaged with the mounting hook 424 of the support member 40. The support member 40, the sliding member 50, and the positioning member 30 are received in the receiving case 223 of the bracket 20. The side plates 34 of the positioning member 30 abut opposite sides of the receiving case 223. The elastic hooks 412 of the support member 40 are engaged with the bracket 20, to prevent the support member 40 from disengaging from the bracket 20. The cover 24 is mounted to the main body 22 of the bracket 20.

Figure 6:
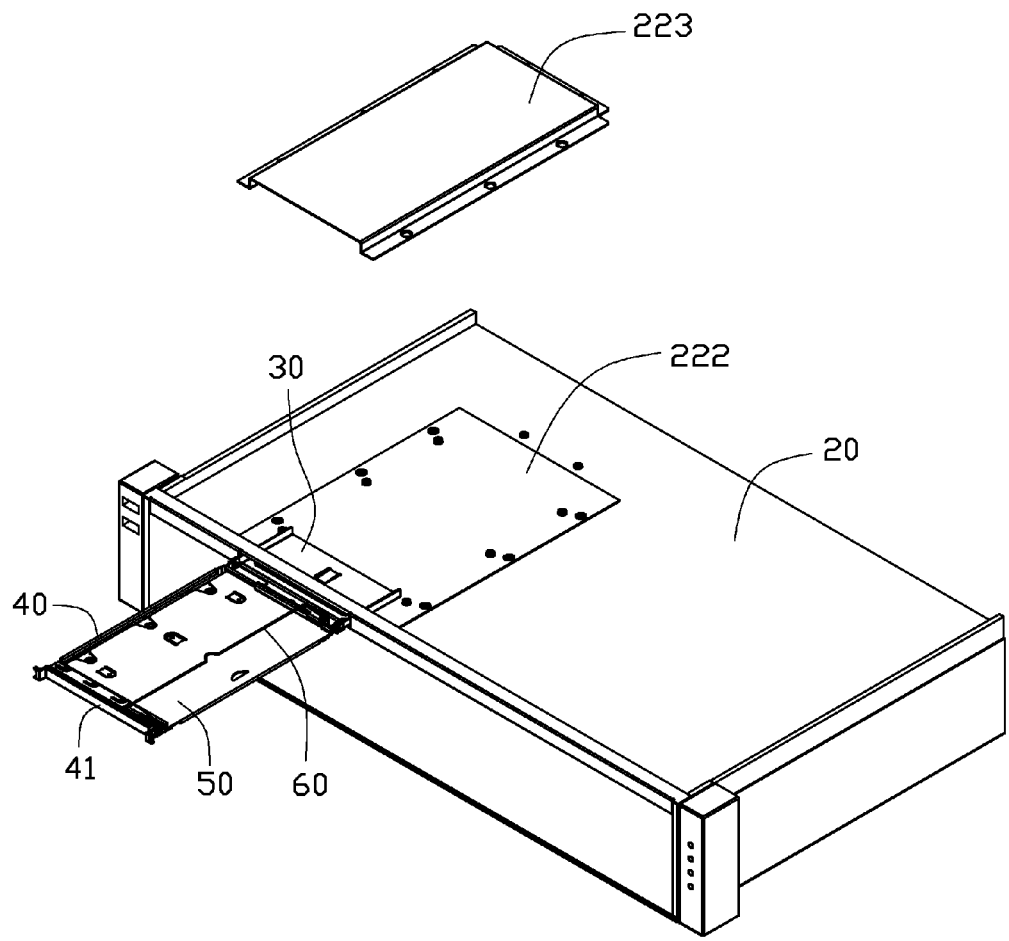
FIGS. 6 and 7 show different operating states of the mounting apparatus for a data storage device of FIG. 3.
Figure 7:
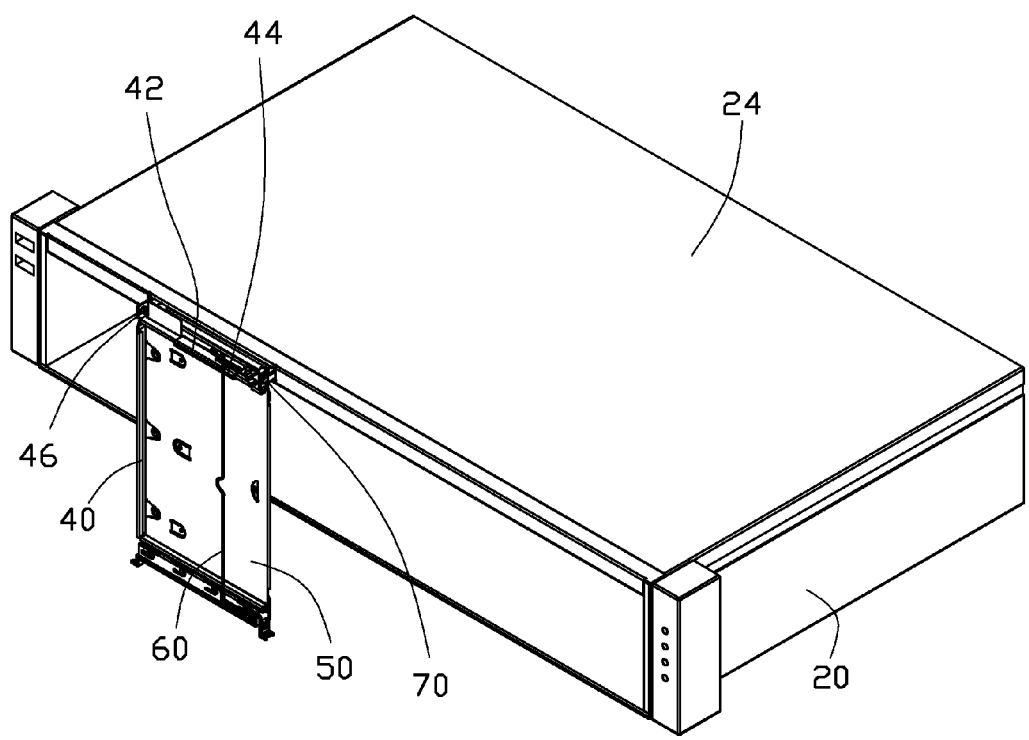

Referring to FIGS. 6 and 7, in use, the elastic hooks 412 are disengaged from the bracket 20, and the support member 40 is drawn out from the bracket 20. In this process, the side plates 34 of the positioning member 30 are slid along the sidewalls of the receiving case 223. When the resisting tab 322 of the positioning member 30 resists against a front end of the bracket 20, the support member 40 cannot be further drawn out from the bracket 20. Thereafter, the support member 40 is rotated around the corresponding pins 70, until the support member 40 is perpendicular to the cover 24 of the bracket 20. The hook 68 of the locking member 60 is rotated around the third pin 70 to away from the mounting hook 424, so the hook 68 is operated to disengage from the mounting hook 424 of the support member 40. Thereby, the locking member 40 is rotated away from the support member 40 around the first and second pivoting portions 64 and 66 of the locking member 60. The sliding member 50 is slid away from the flange 48 of the support member 40 by operating the sliding member 50 at the operation hole 502, meanwhile the protrusions 542 is disengaged from the positioning holes 402. Thereafter, the resisting tabs 54 together with the sliding member 50, move towards and slide into the through holes 404. When the sliding member 50 slides relative to the support member 40 to a predetermined second position, the resisting tabs 54 resist against edges bounding the through holes 404, and the sliding member 50 cannot be slid further along the support member 40.

Referring to FIG. 8, the data storage device 10 is mounted on the support member 40 and the sliding member 50, with the data storage device 10 resisting against the flange 48 of the support member 40 and the rims 52 of the sliding member 50. The locking member 60 is rotated toward the support member 40 to resist against the data storage device 10 with the fixing pole 62. The hook 68 of the locking member 60 is latched to the mounting hook 424 of the support member 40, therefore, the data storage device 10 is mounted to the support member 40.

In other embodiments, the sliding member 50 can be omitted, and the width of the data storage device 10 is equal to the width of the support member 40.

It is believed that the present embodiment and its advantages will be understood from the foregoing description, and it will be apparent that various changes may be made thereto without departing from the spirit and scope of the description or sacrificing all of their material advantages, the example hereinbefore described merely being exemplary embodiment.

What is claimed is:

1. A mounting apparatus for a data storage device, the mounting apparatus comprising:
    a bracket;
    a position member slidably accommodated in the bracket;
    a support member pivotably mounted to the position member, wherein the support member is operable to be drawn out of the bracket together with the position member, and then, is operable to rotate to be perpendicular to a top of the bracket; and
    a locking member comprising a fixing pole, a first pivoting portion extending from a first end of the fixing pole, and a second pivoting portion extending from a second end of the fixing pole, a hook extending from the second pivoting portion, wherein the first and second pivoting portions are pivotably mounted to opposite ends of the support member, when the data storage device is mounted to the support member, the fixing pole resists against the date storage device, and the hook is latched with the support member.

2. The mounting apparatus of claim 1, wherein a fixing block extends from a front end of the support member, a first pin is extended through the first pivoting portion and then pivotably received in the fixing block.

3. The mounting apparatus of claim 2, wherein a fixing tab extends from a rear end of the support member, a second pin is extended through the second pivoting portion and then pivotably received in the fixing tab.

4. The mounting apparatus of claim 3, wherein a mounting hook extends from the rear end of the support member, the hook of the locking member is operable to be latched with the mounting hook.

5. The mounting apparatus of claim 1, wherein the support member is pivotably mounted to a rear end of the positioning member, the bracket comprises a receiving case, the positioning member is slidably received in the receiving case.

6. The mounting apparatus of claim 5, wherein two mounting tabs extend from the positioning member, each mounting tab defines a through hole, two connecting boards extend from the rear end of the support member, the connecting boards are pivotably mounted to the mounting tabs.

7. The mounting apparatus of claim 6, wherein the positioning member comprises a board abutting the bracket, and two side plates extending from opposite ends of the board, the mounting tabs are connected to front ends of the side plate, and slidably abut against sidewalls of the receiving case.

8. The mounting apparatus of claim 7, wherein a resisting tab extends from the board, opposite to the side plates, to resist against the front end of the bracket.

9. The mounting apparatus of claim 5, further comprising a sliding member slidably mounted to the support member, wherein a substantially U-shaped clamping portion extends from a rear end of the support member, two rims extend from opposite ends of the sliding member, one of the rims is slidably received in the clamping portion.

10. The mounting apparatus of claim 9, wherein the clamping portion defines a clamping slot, the one of the rims received in the clamping portion defines a cutout, the clamping slot and the cutout are in alignment with each other when the sliding member is in a predetermined first position relative to the support member, the fixing pole is received in the cutout and the clamping slot.

11. The mounting apparatus of claim 10, wherein the support member defines a plurality of positioning holes when the sliding member is in the sliding member is in the predetermined position relative to the support member, a plurality of protrusions protrude out from the sliding member, and are received in the positioning holes.

12. The mounting apparatus of claim 11, wherein a plurality of resisting tabs extend from the sliding member, the support member defines a plurality of through holes, the resisting tabs are operable to resist against edges bounding the through holes when the sliding member slides relative to the support member to a predetermined second position, each protrusion protrudes out from a corresponding resisting tab.

13. The mounting apparatus of claim 12, wherein a mounting hook extends from the clamping portion, the hook of the locking member is operable to be latched with the mounting hook.

14. The mounting apparatus of claim 9, wherein an operation portion protrudes from a front end of the support member, two elastic hooks extend from opposite ends of the operation portion to latch the bracket.

* * * * *

UNITED STATES PATENT AND TRADEMARK OFFICE
CERTIFICATE OF CORRECTION

| | | |
|---|---|---|
| PATENT NO. | : 8,320,114 B2 | Page 1 of 1 |
| APPLICATION NO. | : 13/013820 | |
| DATED | : November 27, 2012 | |
| INVENTOR(S) | : Wen-Tang Peng, Lian Li and Xin-Hu Gong | |

It is certified that error appears in the above-identified patent and that said Letters Patent is hereby corrected as shown below:

Title Page, below Item (65) insert:

-- (30)    Foreign Application Priority Data

Dec. 21 2010   (CN) .............................2010 1 0598887 --

Signed and Sealed this
Twenty-fourth Day of December, 2013

Margaret A. Focarino
*Commissioner for Patents of the United States Patent and Trademark Office*